Patented Sept. 23, 1947

2,427,706

UNITED STATES PATENT OFFICE 2,427,706

CHEMICAL PRODUCTION OF OXYGEN

Eugene O. Brimm, Kenmore, N. Y., assignor to
The Linde Air Products Company, a corporation
of Ohio No Drawing. Application July 3, 1942,
Serial No. 449,681

6 Claims. (Cl. 23—221)

This invention relates to a novel chemical process for extracting oxygen from a mixture of oxygen with inert gas, and more particularly for separating and collecting gaseous oxygen of high purity from the atmosphere. The invention is also concerned with a novel chemical contact mass for use in the process. More particularly, the invention relates to improvements on the process of DuMotay and Marechal disclosed in United States Patent No. 70,705 of November 12, 1867.

The process of DuMotay et al. is performed by alternately passing air and steam through a closed retort over a hot alkali manganate or similar reaction mass having the ability to be oxidized by the passage of air thereover, and thereafter to be deoxidized and release gaseous oxygen during the passage of steam thereover. The reversible reaction theoretically is:

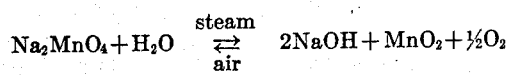

Various reaction masses may be used in the process, as disclosed by DuMotay et al., including the manganates and permanganates of potassium, sodium, or barium, as well as the chromates and ferrates of these metals, and in general all metallic acids or oxides forming, with potassium, sodium, or barium, binary combinations capable of becoming super-oxidized, and also possessing the property of releasing their oxygen at a temperature more or less elevated when they are placed in the presence of a current of steam. During the passage of steam over the hot mass, the gaseous oxygen is collected while the residual steam is condensed and separated from the oxygen. Oxygen of 95% purity or better may be obtained by this process. Of course the nitrogen residue from the air phase of the cycle also may be collected, if this is desired.

The basic process of DuMotay et al. has not been commercially successful in competition with other methods of producing oxygen because of several disadvantages rendering the process economically unprofitable. One of the principal drawbacks of the DuMotay et al. process is the instability of the reaction mass, which deteriorates rapidly after being in service only a short time, with a resulting low oxygen production based on the quantities of air and steam passed over the mass. Moreover, the process consumes huge quantities of steam for the production of oxygen on a large scale, thus making the cost of operation prohibitive. Another serious disadvantage is the relatively great size and cost of the equipment and plant required for producing oxygen on a large scale.

Several attempts have been made by subsequent investigators to improve the fundamental DuMotay et al. process to permit the production of oxygen economically. Development has been mainly aimed at improving the physical or chemical character of the reaction mass for better stability and greater efficiency of oxygen production. Among the best known of these improvements is that proposed by George Kaszner in United States Patent 1,015,566, of January 23, 1912. Kaszner teaches the addition to the alkali manganate mass of an alkali meta-plumbate, such as sodium meta-plumbate, for increased stability. Despite the alleged movement in the stability of the reaction bass, however, there is no substantial increase in the efficiency of oxygen production based on the quantities of steam and air supplied to the mass, excessive quantities of steam being required for oxygen production on a large scale. Furthermore, experiments have shown that Kaszner's "Plumboxan" contact mass is quite unstable because of the gradual volatilization of lead compounds from the mass during operation at high temperatures.

The principal object of the present invention, therefore, is to provide a novel chemical process for extracting oxygen from a mixture of oxygen with inert gas, and more particularly for producing oxygen from the air without the disadvantages of the prior processes discussed above. Another object is the provision of a novel process for producing oxygen by the alternate passage of air and steam over a hot contact mass whereby improved yields of oxygen are obtained. Another object is the provision of such a process which will remain operative over a long period of time. Still another object is the provision of novel contact masses which give an improved combination of high oxygen yield and good stability when steam and air are passed alternately over the mass.

The above and other objects, and the novel features of the invention, will become apparent from the following detailed description:

Generally, the process of this invention comprises passing flowing stream alternately of air and steam over a hot solid manganate type contact mass which is a sintered material comprising complexes of manganese oxygen, boron, and an alkali metal. The mass has a composition and relationship of elements such as theoretically to form a double manganate-metaborate salt $yX_2MnO_4.XBO_2$ wherein X is an alkali metal and $y$ is from 2 to 4. The alkali metal is in excess of the amount required in the double salt by an amount substantially just sufficient theoretically to combine with any other uncombined acidic materials in the mass. The mass is oxidized during the passage of air thereover, and the oxygen is subsequently liberated from the mass and passes off with the residual steam during the steam phase of the process. The residual steam then is condensed and the gaseous oxygen collected for immediate or future use. The cycling of air and steam over the contact mass may be continued indefinitely as long as the contact mass remains reasonably stable. It has been found that with this process, wherein an oxide or salt of boron is added to the mixture for producing a manganate contact mass, improved yields of oxygen are obtained coupled with a mass stability at least as good as that of the "Plumboxan" mass of the Kaszner patent, and better than that of the simple Du Motay manganate contact mass.

In one specific form of contact mass used in the process of the invention, just enough of the sodium or potassium hydroxide is added theoretically to react stoichiometrically with all of the oxide of manganese and all of the boron compound to form, when sintered, sodium or potassium manganate and metaborate. The quantity of the hydroxides added to react with the oxide of manganese is based on the assumption that the components react completely with one another to form the compounds $Na_2MnO_4$ or $K_2MnO_4$; and the quantity of the hydroxide added to react with oxide or salt of boron is calculated on the assumption that the compounds $NaBO_2$ or $KBO_2$ are obtained. It is known, however, that in reality only a small part of the components react with one another to produce these definite compounds, and the balance of the mass may consist of a heterogeneous mixture of complex and simple salts and oxides of manganese with salts and oxides of boron. No exact chemical formula may be assigned to any mass because of this heterogeneity.

The masses may be prepared with atomic ratios of anywhere between 2 and 4 atoms of manganese to 1 atom of boron. For example, when preparing a contact mass on the basis of an atomic ratio of 2 to 1, the quantities of the components mixed together are based on the theoretical formation of a double manganate-metaborate salt having the formula $2Na_2MnO_4.NaBO_2$, although there is no evidence that such a compound actually is formed. For an atomic ratio of 4 to 1, the components are mixed together on the basis of the formula $4Na_2MnO_4.NaBO_2$. Atomic ratios of 4 to 1 have been found to give the best results in practice.

In a typical example of the preparation of a contact mass, 95 grams of $Na_2B_4O_7.10H_2O$ were mixed with 181 grams of $MnO_2$ (60.7% Mn) and 213 grams of NaOH (98% NaOH), and the mixture sintered at 1330° F. A sample of the resulting mass, having theoretically the formula $2Na_2MnO_4.NaBO_2$ (based on the quantities of components added to form the mixture), was cycled with air and steam at about 1200° F. for 10 minute cycles (5 minutes to each phase) at about atmospheric pressure. An oxygen yield of 155 cc. was obtained.

The following table shows examples illustrating the superiority of compounds of boron over several other compounds for addition to manganate contact masses. The contact masses were tested all under similar conditions by passing air and steam alternately over samples of equal weight at 1200° F. for 10 minute cycles (5 minutes to each phase) at about atmospheric pressure.

| Addition | Atomic Ratio in Mass | Sintering Temp., °F. | Oxygen Yield (cc./sample) |
|---|---|---|---|
| Boron | 5Na 2Mn 1B | 1,330 | 155 |
| Lead | 4Na 1Mn 1Pb | 1,700 | 32 |
| Lead | 6Na 2Mn 1Pb | 1,740 | 59 |
| Lead | 10Na 4Mn 1Pb | 1,740 | 55 |
| Bismuth | 5Na 2Mn 1Bi | 1,350 | 84 |
| Arsenic | 5Na 2Mn 1As | 2,140 | 6 |
| Tin | 6Na 2Mn 1Sn | 2,190 | 66 |
| Vanadium | 5Na 2Mn 1V | 2,080 | 12 |
| Tungsten | 6Na 2Mn 1W | 1,510 | 58 |
| Antimony | 5Na 2Mn 1Sb | 2,080 | 10 |
| Phosphorus | 5Na 2Mn 1P | 2,070 | 15 |

Not only were the yields of oxygen obtained when using a compound of boron superior to the yields obtained with any of the oxides or salts of the other listed elements, but also the masses containing boron were at least as stable as the other masses tested, and in some cases, more stable.

Contact masses may be prepared using ore containing manganese dioxide, such as pyrolusite containing about 72% $MnO_2$. As such ores usually contain quantities of uncombined acidic impurities such as silicon dioxide, it is important to use sufficient excess oxidic compound of the alkali metals theoretically to combine not only with the oxide of manganese and the boron compound, but also with the acidic impurities.

No satisfactory theory has been developed to explain the superior results obtainable when oxides or salts of boron are used with manganate contact masses. Kaszner, in his Patent 1,015,566, advanced the theory that his plumbate reacted with free alkali liberated during the steam phase of the process and prevented segregation of alkali from the rest of the mass. There is no strong evidence, however, that this theory is correct. Moreover, there is no evidence that the oxides or salts used according to this invention act in the same way as does the plumbate of Kaszner, irrespective of whether Kaszner's theory is or is not correct.

What is claimed is:

1. A solid manganate type contact mass characterized by its ability to be deoxidized and oxidized alternately by steam and air, respectively, said mass being a sintered material comprising complexes of manganese, oxygen, boron, and an alkali metal, said material having a composition and relationship of elements such as theoretically to form a double manganate-metaborate salt $yX_2MnO_4.XBO_2$, wherein X is an alkali metal and $y$ is from 2 to 4, said alkali metal being in excess of the amount required in said double salt by an amount substantially just sufficient theoretically to combine with the other uncombined acidic materials in the mass.

2. A solid manganate type contact mass characterized by its ability to be deoxidized and oxidized alternately by steam and air, respectively, said mass being a sintered material comprising complexes of manganese, oxygen, boron, and sodium, said material having a composition and relationship of elements such as theoretically to form a double manganate-metaborate salt $yNa_2MnO_4.NaBO_2$, wherein $y$ is from 2 to 4, said sodium being in excess of the amount required in said double salt by an amount substantially just sufficient theoretically to combine with the other uncombined acidic materials in the mass.

3. A solid manganate type contact mass characterized by its ability to be deoxidized and oxidized alternately by steam and air, respectively, said mass being a sintered material comprising complexes of manganese, oxygen, boron, and potassium, said material having a composition and relationship of elements such as theoretically to form a double manganate-metaborate salt $y\text{K}_2\text{MnO}_4.\text{KBO}_2$, wherein $y$ is from 2 to 4, said potassium being in excess of the amount required in said double salt by an amount substantially just sufficient theoretically to combine with the other uncombined acidic materials in the mass.

4. A process for extracting oxygen from a mixture of oxygen with inert gas comprising alternately passing streams of said mixture and steam over a hot solid manganate type contact mass characterized by its ability to be deoxidized and oxidized alternately by steam and oxygen, respectively, said mass being a sintered material comprising complexes of manganese, oxygen, boron, and an alkali metal, said material having a composition and relationship of elements such as theoretically to form a double manganate-metaborate salt $y\text{X}_2\text{MnO}_4.\text{XBO}_2$, wherein X is an alkali metal and $y$ is from 2 to 4, said alkali metal being in excess of the amount required in said double salt by an amount substantially just sufficient theoretically to combine with the other uncombined acidic materials in the mass.

5. A process for extracting oxygen from a mixture of oxygen with inert gas comprising alternately passing streams of said mixture and steam over a hot solid manganate type contact mass characterized by its ability to be deoxidized and oxidized alternately by steam and oxygen, respectively, said mass being a sintered material comprising complexes of manganese, oxygen, boron, and sodium, said material having a composition and relationship of elements such as theoretically to form a double manganate-metaborate salt $y\text{Na}_2\text{MnO}_4.\text{NaBO}_2$ wherein $y$ is from 2 to 4, said sodium being in excess of the amount required in said double salt by an amount substantially just sufficient theoretically to combine with the other uncombined acidic materials in the mass.

6. A process for extracting oxygen from a mixture of oxygen with inert gas comprising alternately passing streams of said mixture and steam over a hot solid manganate type contact mass characterized by its ability to be deoxidized and oxidized alternately by steam and oxygen, respectively, said mass being a sintered material comprising complexes of manganese, oxygen, boron, and potassium, said material having a composition and relationship of elements such as theoretically to form a double manganate-metaborate salt $y\text{K}_2\text{MnO}_4.\text{KBO}_2$ wherein $y$ is from 2 to 4, said potassium being in excess of the amount required in said double salt by an amount substantially just sufficient theoretically to combine with the other uncombined acidic materials in the mass.

EUGENE O. BRIMM.

REFERENCES CITED

The following references are of record in the file of this patent:

UNITED STATES PATENTS

| Number | Name | Date |
| --- | --- | --- |
| 500,697 | Webb | July 4, 1893 |
| 1,124,304 | Danckwardt | Jan. 12, 1915 |
| 1,303,911 | Jorgensen | May 20, 1919 |
| 1,694,122 | Jaeger | Dec. 4, 1928 |
| 2,004,243 | Hlock | June 11, 1935 |
| 2,086,507 | Larson | July 6, 1937 |
| 2,176,774 | Sweet et al. | Oct. 17, 1939 |